(12) United States Patent
Nielson (10) Patent No.: US 9,256,033 B2
(45) Date of Patent: Feb. 9, 2016

(54) CYLINDRICAL OPTICAL FERRULE ALIGNMENT APPARATUS

(71) Applicant: CommScope, Inc. of North Carolina, Hickory, NC (US)

(72) Inventor: Jeffrey D. Nielson, Longmont, CO (US)

(73) Assignee: CommScope, Inc. of North Carolina, Hickory, NC (US)

( * ) Notice: Subject to any disclaimer, the term of this patent is extended or adjusted under 35 U.S.C. 154(b) by 86 days.

(21) Appl. No.: 14/161,792

(22) Filed: Jan. 23, 2014

(65) Prior Publication Data

US 2014/0205241 A1 Jul. 24, 2014

Related U.S. Application Data

(60) Provisional application No. 61/755,721, filed on Jan. 23, 2013.

(51) Int. Cl.
*G02B 6/38* (2006.01)

(52) U.S. Cl.
CPC ............ *G02B 6/3825* (2013.01); *G02B 6/3877* (2013.01)

(58) Field of Classification Search
CPC .. G02B 6/3825; G02B 6/3879; G02B 6/3858; G02B 6/3874
USPC .......................................... 385/60, 62, 66, 53
See application file for complete search history.

(56) References Cited

U.S. PATENT DOCUMENTS

| | | | |
|---|---|---|---|
| 4,353,619 A * | 10/1982 | Parr | 385/64 |
| 5,727,101 A | 3/1998 | Giebel et al. | |
| 5,940,561 A | 8/1999 | Dean, Jr. et al. | |
| 6,179,478 B1 * | 1/2001 | Shouji et al. | 385/70 |
| 6,461,054 B1 * | 10/2002 | Iwase | 385/73 |
| 6,485,199 B1 * | 11/2002 | Ware et al. | 385/99 |
| 7,147,384 B2 | 12/2006 | Hardcastle et al. | |
| 7,387,447 B2 | 6/2008 | Mudd et al. | |
| 7,507,032 B2 * | 3/2009 | Katagiyama et al. | 385/73 |
| 7,548,674 B1 | 6/2009 | Horibe et al. | |
| 7,604,417 B2 | 10/2009 | Nielson et al. | |
| 7,625,129 B2 | 12/2009 | Nielson et al. | |
| 8,038,354 B2 | 10/2011 | Nielson et al. | |
| 8,175,431 B2 | 5/2012 | Imada et al. | |
| 8,936,400 B2 * | 1/2015 | Jibiki et al. | 385/75 |
| 2002/0085815 A1 | 7/2002 | Shinagawa et al. | |
| 2003/0059169 A1 * | 3/2003 | Watanabe et al. | 385/60 |

(Continued)

FOREIGN PATENT DOCUMENTS

JP 2002-116351 4/2002

*Primary Examiner* — Ellen Kim
(74) *Attorney, Agent, or Firm* — Muncy, Geissler, Olds & Lowe, P.C.

(57) ABSTRACT

An alignment sleeve for an optical fiber adapter includes features to bring precision alignment between optical fiber cores. The sleeve includes a tubular inner area to accept first and second ferrule ends of first and second connectors. First and second tabs project from first and second ends of the sleeve. The first and second tabs slide into holes in the ferrule holders or barrels of the first and second connectors, so as to provide rotational alignment of the first and second ferrules, which may be presenting multi-core optical fibers. A mid-portion of the sleeve may include geometrical features to enable a snap fit of the sleeve into a housing of the adapter. More than one tab may be employed at the ends of the sleeve, and the tabs may have defined spacing and/or dimensions to enable security keying, only permitting coupling between connectors possessing matching holes in the ferrule barrels.

19 Claims, 9 Drawing Sheets

(56) References Cited

U.S. PATENT DOCUMENTS

| | | |
|---|---|---|
| 2004/0105625 A1 | 6/2004 | Ueda et al. |
| 2005/0013563 A1 | 1/2005 | Woodruff |
| 2005/0201690 A1 | 9/2005 | Taira et al. |
| 2007/0217747 A1 | 9/2007 | Greub et al. |
| 2007/0230874 A1* | 10/2007 | Lin .................. 385/53 |
| 2010/0247040 A1* | 9/2010 | Kuriki et al. .................. 385/72 |
| 2011/0229085 A1 | 9/2011 | Bradley et al. |
| 2011/0229086 A1 | 9/2011 | Bradley et al. |
| 2012/0219255 A1 | 8/2012 | Bradley et al. |
| 2012/0321266 A1 | 12/2012 | Lin et al. |

* cited by examiner

CYLINDRICAL OPTICAL FERRULE ALIGNMENT APPARATUS

This application claims the benefit of U.S. Provisional Application No. 61/755,721, filed Jan. 23, 2013, which is herein incorporated by reference.

BACKGROUND OF THE INVENTION

1. Field of the Invention

The present invention relates to an adapter for communicating a first fiber optic connector to a second fiber optic connector. More particularly, the present invention relates to an alignment feature of an adapter, which enables precise alignment of the cores of a multi-core fiber end of the first connector with the corresponding cores of a multi-core fiber end of the second connector.

2. Description of the Related Art

Figures 1, 2:
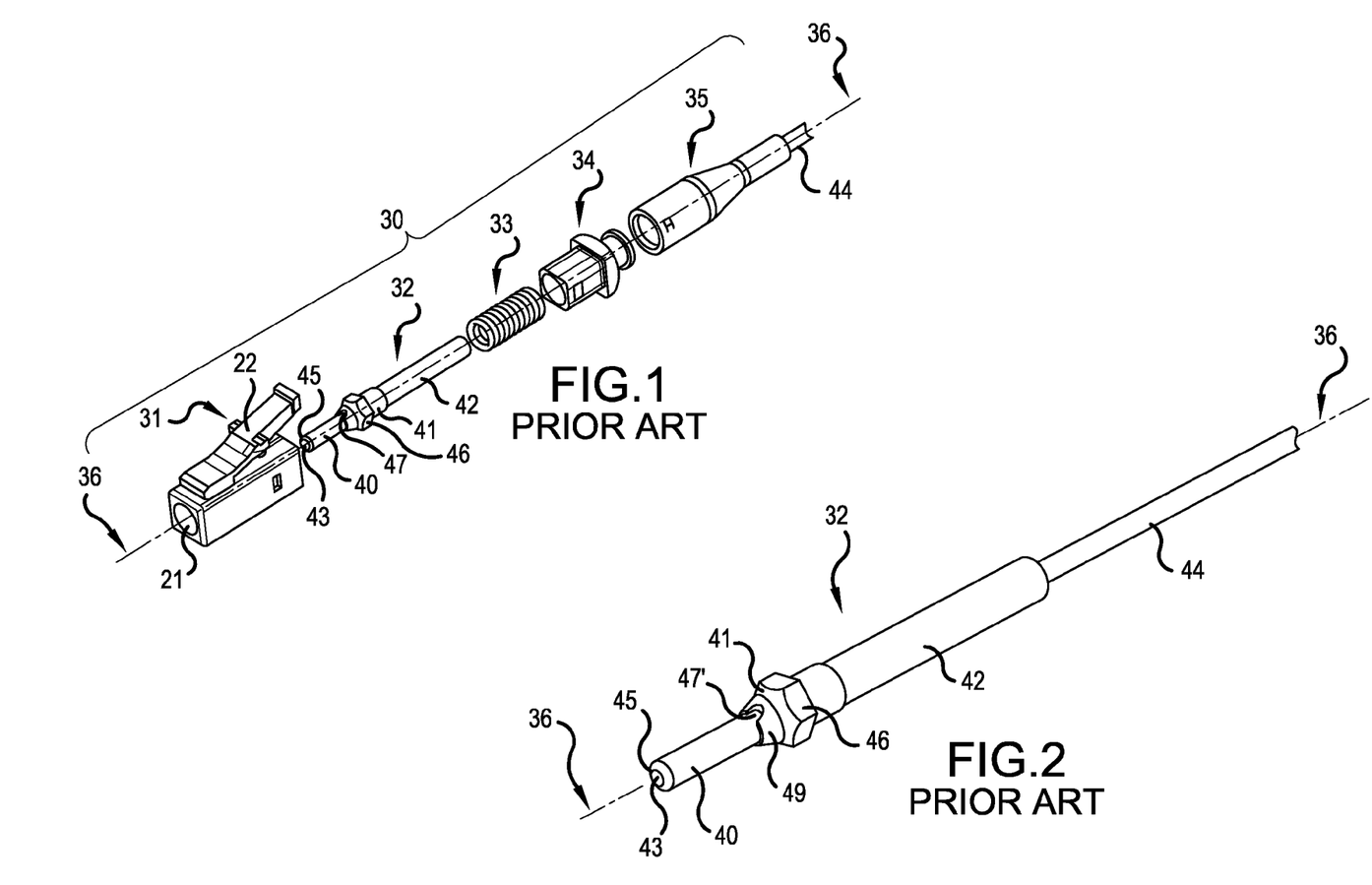
FIG. 1 is an exploded, perspective view of an LC connector for an optical fiber, in accordance with the prior art.
FIG. 2 is a close-up, perspective view of a ferrule subassembly in FIG. 1.

FIG. 1 shows an exploded view of a simplex connector, in the form of an LC connector 30, in accordance with the prior art. The LC connector 30 comprises the following components, from left to right: plug housing 31; ferrule subassembly 32; spring 33; extender 34; and buffer boot 35. For the purposes of the present discussion, the adjectives "front" and "lead" refer to the plug end of a connector (i.e., the left side of FIG. 1). The adjectives "rear" and "tail" refer to the boot end of a connector (i.e., the right side of FIG. 1). Components 31-35 share a common longitudinal axis 36.

In the assembled connector 30, the ferrule subassembly 32 with the cable end mounted thereto, "floats" along longitudinal axis 36 within an enclosure comprising plug housing 31, extender 34, and buffer boot 35. Spring 33 provides spring-loading of the ferrule subassembly 32 within the enclosure, such that the ferrule subassembly 32 is biased toward the front end of plug housing 31. Boot 35 relieves mechanical strain on the optical fiber cable 44.

Ferrule subassembly 32 includes a ferrule 40, a ferrule holder 41 (sometimes referred to as a ferrule barrel), and tubing 42. The ferrule 40 has a precision hole extending down its length, along axis 36. The hole is shaped to closely receive a bare optical fiber from a stripped end of an optical fiber cable 44. The bare fiber is trimmed at the ferrule tip 45 and polished, resulting in an exposed fiber end face 43. Ferrule holder 41 includes a hexagonal flange 46 and a front cone portion 49 having a pair of slots 47, 47' in its perimeter. The details of the slots 47, 47' and exposed fiber end face 43 are best seen in the close-up perspective view of the ferrule subassembly 32 shown in FIG. 2.

When connector 30 is fully assembled, the ferrule tip 45 is accessible through an opening 21 at the front of the plug housing 31. The plug housing 31 includes a latch arm 22 that is used to releasably attach the connector 30 into a corresponding socket or jack (not shown).

Figure 3:
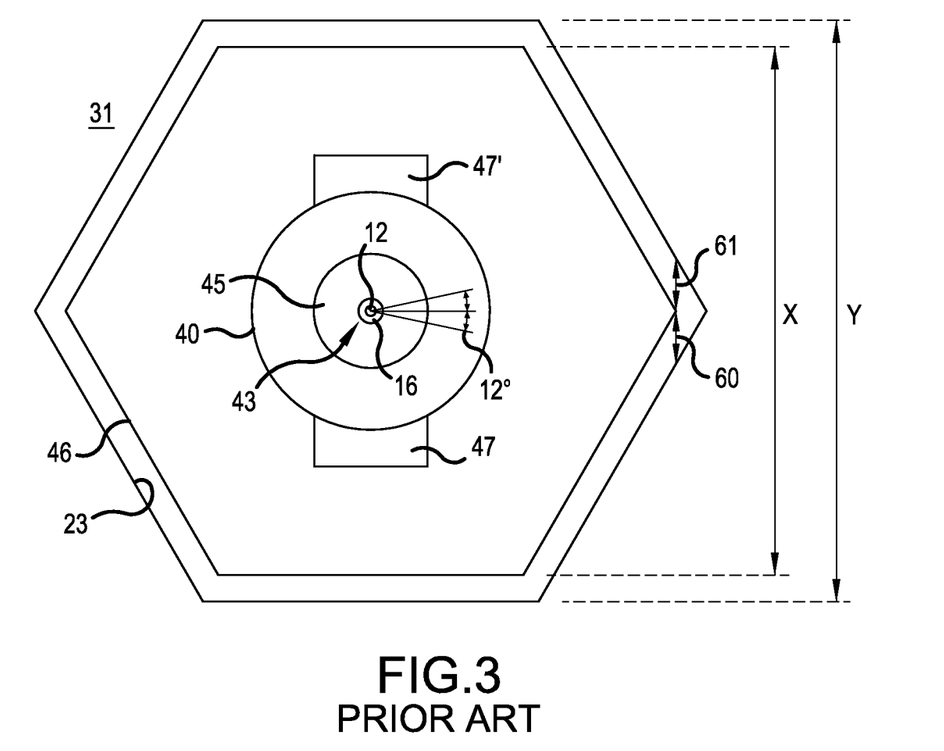
FIG. 3 is a diagram depicting play in the fitting of a hexagonal flange of a ferrule holder within a hexagonal cavity of a plug housing, in accordance with the prior art.

As best seen in FIG. 3, when connector 30 is fully assembled, the hexagonal flange 46 is seated in a corresponding hexagonal cavity 23 within plug housing 31, thereby limiting rotation of the flange/ferrule assembly 32 around axis 36.

Figure 4:
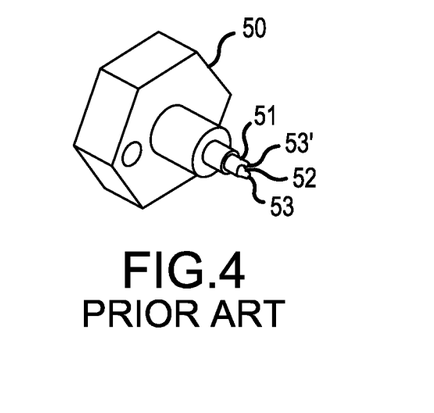
FIG. 4 is a perspective view of a turning wrench, in accordance with the prior art.

FIG. 4 shows a perspective view of a tuning wrench 50 that can be used to rotate the ferrule subassembly 32 around its longitudinal axis 36 in an assembled connector 30. The ferrule subassembly 32 can be rotated in order to improve core alignment, as will be discussed in relation to FIG. 5. As shown in FIG. 4, the tuning wrench 50 includes a hollow shaft 51 having an opening 52 therein that fits through the plug housing opening 21 and around the ferrule 40. Teeth 53, 53' engage the pair of slots 47, 47' in the front cone portion 49 of the ferrule holder 41.

In use, the tuning wrench 50 pushes the ferrule subassembly 32 along its longitudinal axis 36 toward the tail end of the assembled connector 30, such that spring 33 is compressed, and such that hexagonal flange 46 is unseated from its receiving cavity 23 in plug housing 31. Once the hexagonal flange 46 is unseated, the ferrule subassembly 32 can then be freely rotated clockwise or counter-clockwise around its longitudinal axis 36. Releasing the tuning wrench 50 causes the hexagonal flange 46 to be reseated in its receiving cavity 23. It will be appreciated that the ferrule subassembly 32 can only be rotated to one of six orientations (i.e., sixty degree positional tuning) relative to the plug housing 31, corresponding to the six possible engagement locations of the hexagonal flange 46 within the corresponding hexagonal cavity 23 of the plug housing 31.

Figure 5:
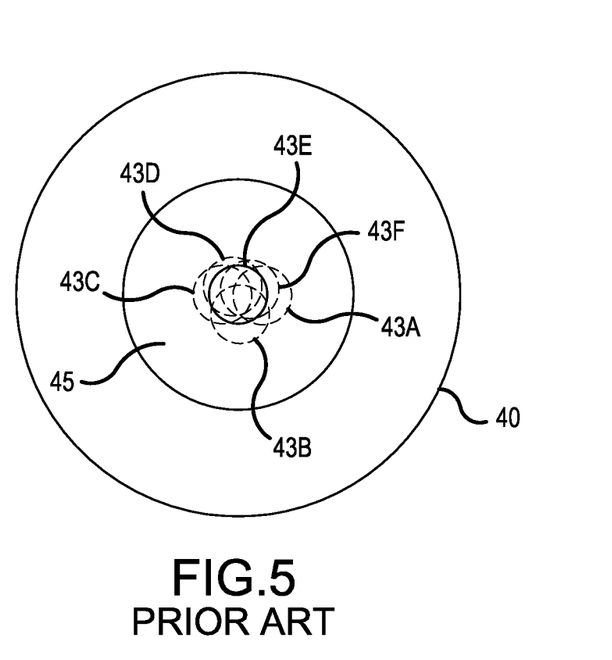
FIG. 5 is a diagram depicting six potential locations of a fiber end presented by a fiber optical connector due to an eccentric error in the fiber placement, in accordance with the prior art.

FIG. 5 illustrates the six potential placements 43A-43F of the exposed fiber end face 43. The reason the exposed fiber end face is not always dead center is due to manufacturing tolerances in getting the fiber core 12 centered in the cladding layer 14, and/or an off-center or canted hole extending down the length of the ferrule 40, and/or the hole in the ferrule 40 is oversized to allow for the epoxy adhering the optical fiber into the hole, and the epoxy is not forming an even layer around the optical fiber within the hole.

Therefore, it is commonly known to view and/or detect the end face 43 of the optical fiber and use the turning wrench 50 to select the one position, shown in bold with reference numeral 43E, out of the six potential positions 43A-43F, which best places the fiber core 12 of the exposed fiber end face 43 in the center of the opening 21 of the plug housing 31. Alternatively the fiber core can be positioned closest to a preferred location, for example 12 o'clock, to maximize transmission between two coupled connectors. The best positioning of the end face 43, e.g., the position which best minimizes the eccentric error, may also be determined with resort to a light measuring detector, which measures the intensity of light being received from the center of the connector end. More details concerning the correction of the eccentric error can be found in US Published Application 2002/0085815, which is herein incorporated by reference.

As can be seen in FIG. 3, the fit between the hexagonal flange 46 and the corresponding hexagonal cavity 23 of the plug housing 31 has significant play 60, 61. A typical hexagon flange 46 has a width dimension of X, e.g., 2.8000 mm, while a typical hexagonal cavity 23 within the plug housing 31 has a width dimension Y, e.g., 3.0700 mm. Based upon these measurements, Applicants have evaluated the play and found that the hexagonal flange 46 may rotated up to +/−twelve degrees within the hexagonal cavity 23 of the plug housing 31. The +/−play is represented by the double headed arrows 60 and 61 in FIG. 3. Such play has been acceptable in the art, wherein the optic fiber 43 presented a single core 12 transmitting light. As one could typically select one of the potential six positions, e.g., a sixty degree optimization, and minimize the eccentric error to a level producing acceptable dB loss across a mated pair of connectors, and the +/−additional twelve degrees of play did not greatly deteriorate the dB loss across the mated pair of connectors.

Figure 6:
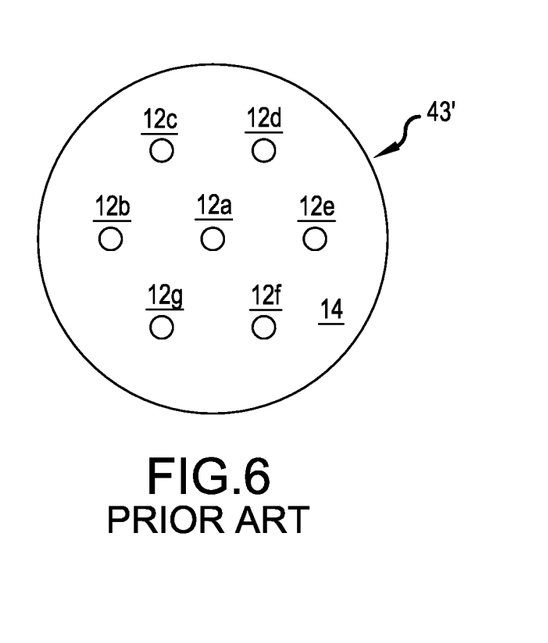
FIG. 6 is an end view of a multi-core optical fiber, in accordance with the prior art.

A current development in the fiber arts is the multi-core optical fiber 43'. As shown in FIG. 6, the multi-core optical fiber 43' presents multiple cores 12a-12g within a single cladding layer 14. The depiction of FIG. 6 shows a center core 12a and six satellite cores 12b-12g.

When a first multi-core optical fiber connector 30 mates with a second multi-core optical fiber connector 30A, it is important that each core 12a-12g of the first connector 30 comes into alignment with each core 12a-12g of the second connector 30A. Therefore, the play 60 and 61 depicted in FIG. 3 is not acceptable. A plus or minus twelve degree shift could allow the satellite cores 12b-12g to be completely offset and out of communication when a first multi-core optical fiber connector 30 is mated to a second multi-core optical fiber connector 30A via a pass through adapter.

To address this concern, the prior art of US Published Application 2011/0229085, which is herein incorporated by reference, has reduced the allowable tolerances between the hexagonal flange 46 of the ferrule holder 41 and the hexagonal cavity 23 of the plug housing 31. In US Published Application 2011/0229085, "a tightly toleranced internal hexagonal cavity" is employed, as it is important that the shape geometry employed on the collar of the ferrule holder "match" the shape geometry employed in the internal plug housing. Excessive play, e.g., +/−twelve degrees, would not be acceptable.

In US Published Application 2011/0229085, the external geometry of the ferrule holder, e.g., the hexagonal flange 46, is tightly seated without play into the internal geometry of the plug housing, e.g., the hexagonal cavity 23, relatively rotatable parts of the connector which could affect the angular placement of the satellite cores 12b-12g are preferably locked down in place with epoxy.

SUMMARY OF THE INVENTION

The Applicant has appreciated drawbacks in the multi-core fiber optic connectors of the prior art. It is an object of the present invention to address one or more of the drawbacks and other perceived needs in the art.

It is appreciated that precision molding of the internal cavity of the plug housing is difficult and increases the costs. Plug housings with out of tolerance internal cavities would need to be recycled. Further, the plastic portions of the housing can be subject to abrasion and may over time expand to develop play in the nesting between the external geometry of the ferrule holder and the internal geometry of the plug housing, which could lead to degraded communication performance in one or more cores. Also, the entire plug housing may slightly rotate about its central axis within a port of an adapter because of a clearance fit between the plug's housing and the walls of the port.

It is an object of the present invention to provide a low cost dependable fiber optic adapter, suitable for multi-core optical fibers.

It is an object of the present invention to provide an alignment sleeve which is robust and does not require a boss within the adapter housing, which may be snap attached into an adapter housing, and/or which may potentially obviate the need for a two piece adapter housing.

It is an object of the present invention to provide an alignment sleeve with security keying which may prevent an unauthorized fiber connector from achieving communication mating within an adapter.

These and other objects are accomplished by a device including a ferrule alignment sleeve, wherein said sleeve extends in a longitudinal direction and forms a generally tubular inner area; a first rim formed around a first opening at one end of said tubular area to receive an end of a first circular ferrule; a second rim formed around a second opening at an opposite end of said tubular area to receive an end of a second ferrule; and a first tab adjacent said first rim and projecting away from said tubular area.

Further, these and other objects are accomplished by a device including an adapter housing having a wall; a through hole formed in said wall of said adapter housing; and a latch projecting from said wall toward said through hole, wherein an end edge of said latch forms an edge of said through hole, and wherein said latch is deflectable so as to deflect without breakage when engaged by an object larger in size than said through hole being pressed into said through hole, and wherein said latch is resilient so as to snap back to an original position after the oversized object disengages said end edge of said latch.

Moreover, these and other objects are accomplished by a device including a ferrule alignment sleeve, wherein said sleeve extends in a longitudinal direction and forms a generally tubular inner area, and wherein a mid-section of said sleeve includes a recessed area extending into an outer surface of said sleeve toward said tubular inner area; a first rim formed around a first opening at one end of said tubular area to receive an end of a first circular ferrule; a second rim formed around a second opening at an opposite end of said tubular area to receive an end of a second ferrule; a first tab adjacent said first rim and projecting away from said tubular area; a second tab adjacent said second rim and projecting away from said tubular area; an adapter housing having a wall; a through hole formed in said wall of said adapter housing; and a latch projecting from said wall toward said through hole, wherein an end edge of said latch forms an edge of said through hole, and wherein said latch is deflectable so as to deflect without breakage when engaged by an object larger in size than said through hole being pressed into said through hole, wherein said latch is resilient so as to snap back to an original position after the oversized object disengages said end edge of said latch, and wherein said at least one resilient latch snaps into said recessed area of said sleeve as said sleeve passes through said through hole and acts to attach said sleeve within said adapter housing.

BRIEF DESCRIPTION OF THE DRAWINGS

The present invention will become more fully understood from the detailed description given hereinbelow and the accompanying drawings, which are given by way of illustration only, and thus, are not limits of the present invention.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 7:
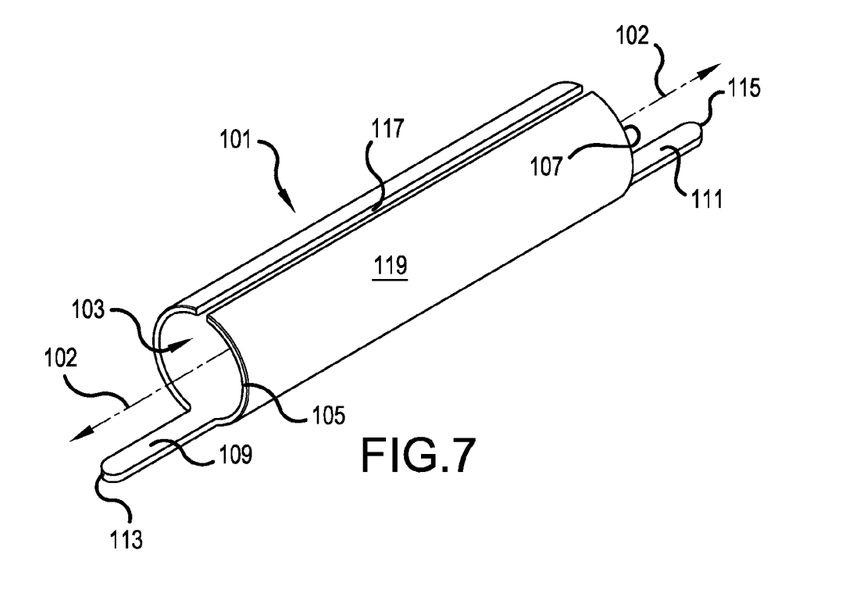
FIG. 7 is a perspective view of an alignment sleeve, in accordance with a first embodiment of the present invention.
Figure 8:
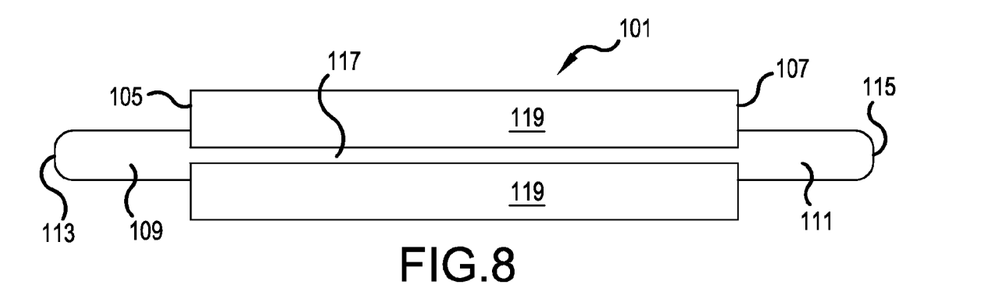
FIG. 8 is a top view of the alignment sleeve of FIG. 7.
Figure 9:
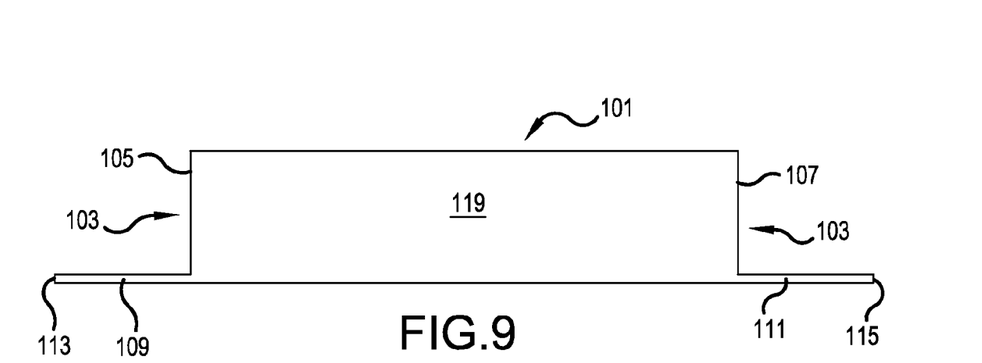
FIG. 9 is a side view of the alignment sleeve of FIG. 7.

FIGS. 7-9 show various views of a ferrule alignment sleeve 101, in accordance with a first embodiment of the present invention. The sleeve 101 extends in a longitudinal direction 102 and forms an inner, generally tubular area 103. A first rim 105 is formed around a first opening at one end of the tubular area 103 to receive an end of a first circular ferrule 40 (see FIG. 12). A second rim 107 is formed around a second opening at an opposite end of the tubular area 103 to receive an end of a second ferrule 40A.

A first tab 109 is located adjacent to the first rim 105 and projects away from the tubular area 103. A second tab 111 is located adjacent to the second rim 107 and projects away from the tubular area 103. In a preferred embodiment, the first tab 109 has a generally radiused or triangular tip at its distal end 113, and the second tab 111 also has a generally radiused or triangular tip at its distal end 115.

In one embodiment, the sleeve 101 is split in a direction parallel to its longitudinal line of extension 102 by an opening 117. Hence, the sleeve 101 presents a C-shaped appearance in a cross-sectional view, taken through the tubular area 103 in a direction perpendicular to its longitudinal line of extension 102. The sleeve 101 may be formed of zirconia, alumina, phosphor bronze, stainless steel, a filled polymer or unfilled polymer, a metal, an alloy, glass, ceramic, or similar material. Also, the sleeve 101 may be coated with a hard material, like diamond-grade materials or titanium nitride, to reduce wear due to abrasion. In the embodiment depicted in FIGS. 7-9, the outer surface 119 of the sleeve 101 presents a generally smooth, cylindrical surface.

Figure 10:
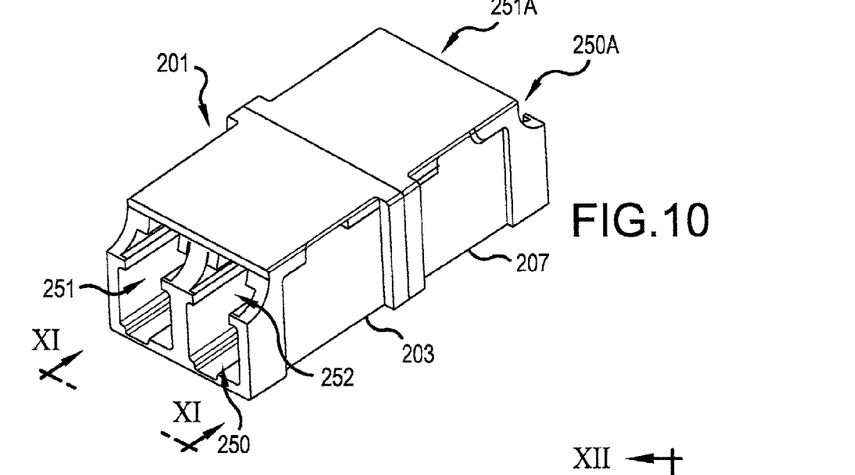
FIG. 10 is a perspective view of a fiber optic adapter, in accordance with a first embodiment of the present invention.
Figure 11:
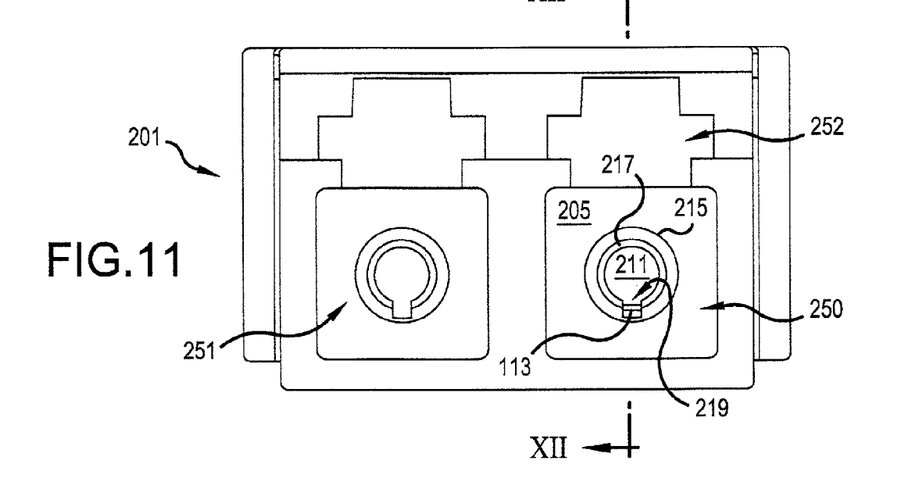
FIG. 11 is an end view looking into the adapter in the direction of line XI-XI of FIG. 10.
Figure 12:
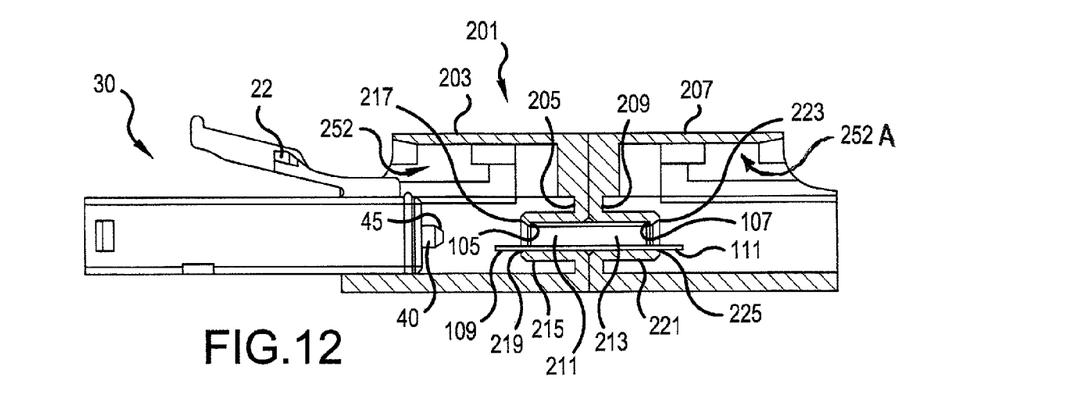
FIG. 12 is a cross-sectional view taken along line XII-XII in FIG. 11, and also illustrating the partial insertion of a fiber connector.

FIG. 10 is a perspective view of a fiber optic adapter 201, in accordance with a first embodiment of the present invention. FIG. 11 is an end view looking into the adapter 201 in the direction of line XI-XI in FIG. 10. FIG. 12 is a cross-sectional view taken along line XII-XII in FIG. 11, and also illustrating the partial insertion of a fiber connector.

The depicted adapter 201 is a duplex adapter having first and second ports 250 and 250A on one lateral side, with each port 250 or 250A sized to receive one of a mating pair of connectors, e.g., connectors 30 of FIG. 1. Third and fourth ports 251 and 251A are located on the opposite lateral side of the adapter 201. A connector 30 in first port 250 will have its single core or multi-core optical fiber mated to the optical fiber of a connector 30 in the second port 250A. Likewise, a connector 30 in third port 251 will have its single core or multi-core optical fiber mated to the optical fiber of a connector 30 in the fourth port 251A. Since the structure concerning the first and second ports 250, 250A is the same as the structure concerning the third and fourth ports 251, 251A, the following description will focus on the first and second ports 250 and 250A only.

The adapter 201 is formed by a housing including by a first part 203 with a first wall 205 and a second part 207 with a second wall 209. A first through hole 211 is formed in the first wall 205 of the first part 203. A second through hole 213 is formed in said second wall 209 of the second part 207.

A first cylindrical boss 215 has a proximate end attached to the first wall 205 and encircles the first hole 211. The first cylindrical boss 215 extends away from the first wall 205 and terminates at a distal end with a first turned edge 217 protruding toward a center of the first cylindrical boss 215. The first turned edge 217 has a first gap 219.

A second cylindrical boss 221 has a proximate end attached to the second wall 209 and encircles the second hole 213. The second cylindrical boss 221 extends away from the second wall 209 and terminates at a distal end with a second turned edge 223 protruding toward a center of the second cylindrical boss 221. The second turned edge 223 has a second gap 225.

The first wall 205 abuts, and is retained in abutment, with the second wall 209 while the first and second holes 211 and 213 are aligned, as illustrated in FIG. 12. The first and second walls 205 and 209 can be retained in the abutment position by adhesion, e.g., epoxy, by a fixing device, e.g., a clip, by molded features, e.g., snap engaging components, by ultrasonic welding, or by other known methods. Prior to attachment, the sleeve 101 of FIGS. 7-9 is inserted into the aligned holes 211 and 213. In particular, the sleeve 101 resides inside of the first boss 215 and the second boss 221. FIG. 11 depicts a sleeve 101 installed in the first port 250, but no sleeve installed in the third port 251.

The first rim 105 of the sleeve 101 cannot pass by the first turned edge 217 of the first boss 215 and the second rim 107 of the sleeve 101 cannot pass by the second turned edge 223 of the second boss 221. By this arrangement, the sleeve 101 is attached within the first and second bosses 215 and 221, and hence within the housing of the adapter 201. The first tab 109 of the sleeve 101 passes through the first gap 219 in the first turned edge 217. The second tab 111 of the sleeve 101 passes through the second gap 225 in the second turned edge 223.

The first port 250 resides on a side of the first wall 205 possessing the first boss 215. The second port 250A resides on a side of said second wall 209 possessing the second boss 221. A first fiber optic connector 30 would be seated into the first port 250. The first fiber optic connector 30 would include a first ferrule holder 41 holding a first ferrule 40 and a first optical fiber end 43 residing within a central bore of the first ferrule 40. FIG. 12 depicts the first connector 30 being partially inserted into the first port 250. As the first connector 30 is fully seated into the first port 250, the first connector's latch arm 22 will enter into a latch track 252 and snap lock in place. As the first connector 30 begins to fully seat, the first tab 109 of the sleeve 101 extends into the first slot 47 formed in the first ferrule holder 41. The generally radiused or triangular tip at the distal end 113 of the first tab 109 assists in the insertion of the first tab 109 into the first slot 47.

A second fiber optic connector 30A would be seated into the second port 250A. The second fiber optic connector 30A would include a second ferrule holder 41A holding a second ferrule 40A and a second optical fiber end 43A residing within a central bore of the second ferrule 40A. As the second connector 30A is fully seated into the second port 250A, the second latch arm 22A will enter into a second latch track 252A and snap lock in place. As the second connector 30A begins to fully seat, the second tab 111 of the sleeve 101 extends into the second slot 47A formed in the second ferrule holder 41A. The generally radiused or triangular tip at the distal end 115 of the second tab 111 assists in the insertion of the second tab 111 into the second slot 47A.

Figure 13:
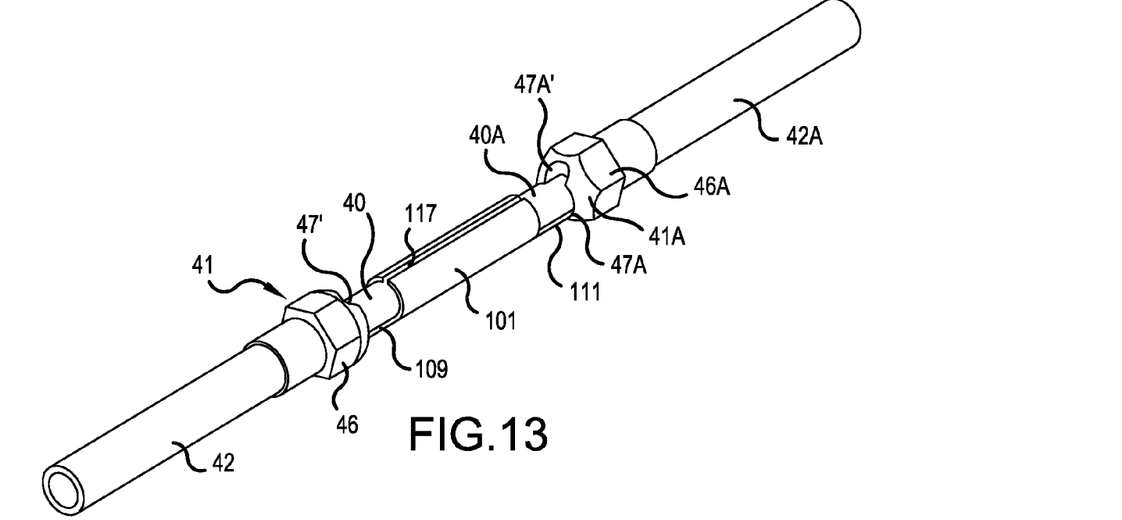
FIG. 13 is a perspective view of first and second mated fiber connectors within the adapter of FIG. 10, with all of the structure except the alignment sleeve removed from the adapter, and all of the structure except the ferrules, ferrule holders, and tubes removed from the first and second fiber connectors.
Figure 14:
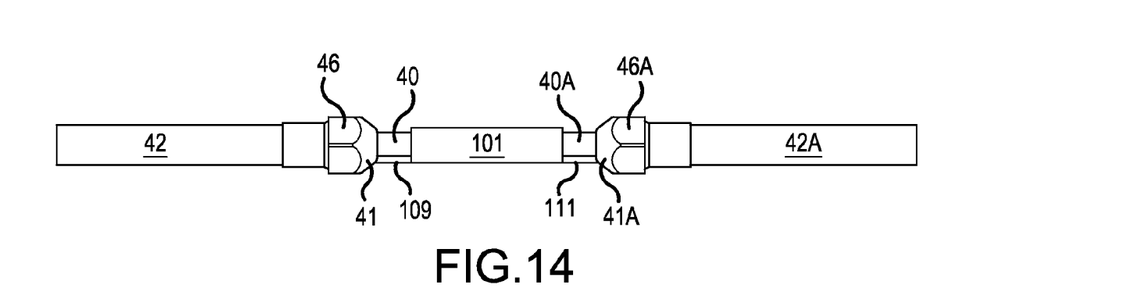
FIG. 14 is a side view of the arrangement of FIG. 13.

FIG. 13 is a perspective view of the first and second mated fiber connectors 30 and 30A within the adapter 201 of FIG. 10, with all of the structure except the alignment sleeve 101 removed from the adapter 201, and all of the structure except the ferrules 40 and 40A, ferrule holders 41 and 41A, and tubes 42 and 42A removed from the first and second fiber connectors 30 and 30A. FIG. 14 is a side view of the arrangement of FIG. 13.

As seen in FIGS. 13-14, when the first and second tabs 109 and 111 engage into the first and second slots 47 and 47A, the first and second slots 47 and 47A become quite precisely aligned. The alignment can be very advantageous when the first optical fiber 43 is a first multi-core optical fiber, e.g., FIG. 6, and the second optical fiber 43A is a second multi-core optical fiber. By clocking the position of the satellite cores $12b$-$12g$ relative to the lower slot 47 of the ferrule holder 41 prior to attaching the fiber 43 to the ferrule 40, e.g., by epoxy, it will be known that the first and second multi-core optical fibers 43 and 43A are aligned with each other, such that all of the cores $12a$-$12g$ are in communication when the first and second tabs 109 and 111 of the sleeve 101 create an alignment between the lower slots 47 and 47A and the ends 45 and 45A of the ferrules 40 and 40A abut.

If only the inner cavity 23 of the connector housing were used to align the multi-core fibers, the alignment could be off by up to plus or minus twelve degrees, as shown in FIG. 3. However, by the present invention's use of the "existing" slot 47 in the ferrule holder 41, previously used to rotate the ferrule to improve upon the eccentric error of a single core fiber, the alignment error can be reduce to plus or minus one and a half degrees or less. Such a small angular variation allows the satellite cores $12b$-$12g$ to stay in alignment for effective communication across a pass-through adapter 201.

Instead of using "existing" ferrule holders 41 with "existing" slots 47 and 47', it is within the purview of the present invention, to machine a ferrule holder with a slot or plural slots design for the optimization of the function of the present invention. To that end, the slot could be wider at its opening and narrow down to a precise size. The wider opening could assist in the initial "finding" of the slot by the tabs 109 or 111, and could operate in conjunction with the radius or triangular shape at the ends 113 and 115 of the tabs 109 and 111. Further, the previous slots 47 and 47' were designed only to engage with the teeth 53 and 53' of the wrench 50 of FIG. 4, so as to permit a large course rotation of the ferrule holder, e.g., sixty degree. The dimensional tolerances of the prior art slots 47 and 47' are not of great concern. In accordance with the present invention, the dimensional tolerances can be more precise and monitored during fabrication of the ferrule holder 41. A close tolerance for the slots 47 or 47' can further reduce the potential plus or minus error of the rotational alignment of the satellite cores 12b-12g.

It is also a feature of the present invention that slots 47 could be closely spaced at precise distances from each other, have different and precise widths and or depths. The slots 47 could then be used as a keying feature. For example, FIG. 15 is a perspective view of a modified alignment sleeve 161 with security keying features to engage in such a ferrule holder with multiple keying slots.

The sleeve 161 includes a first tab 163 located adjacent to the first rim 105 and projecting away from the tubular area 103, and a second tab 165 located adjacent to the second rim 107 and projecting away from the tubular area 103. The sleeve 161 further includes a third tab 167 adjacent the first rim 105 and projecting away from the tubular area 103 and a fourth tab 169 adjacent the second rim 107 and projecting away from the tubular area 103. The third tab 167 is spaced a predetermined distance away from the first tab 163. The fourth tab 169 is spaced a predetermined distance away from the second tab 165. The predetermined spacing is a first keying aspect, such that a ferrule holder 41, which does not possess two slots spaced by the predetermined distance, will not be able to fully seat into first port 250 of the adapter 201 and will therefore not be allowed to communicate with another connector seated into the second port 250A of the adapter 201.

Figure 15:
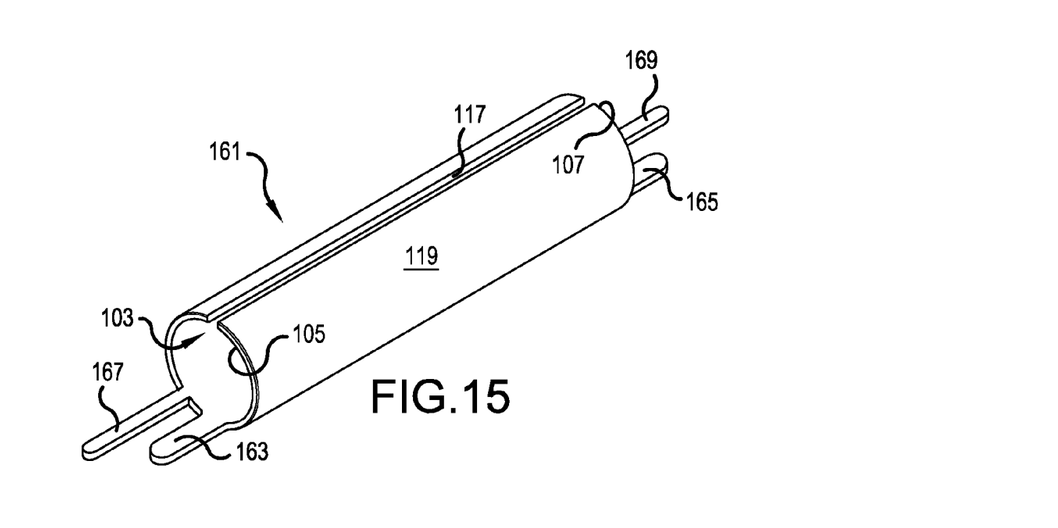
FIG. 15 is a perspective view of a modified alignment sleeve with security keying features.

As also seen in FIG. 15, the width dimension of the third tab 167 is different, e.g., narrower, than the width dimension of the first tab 163, and the width dimension of the fourth tab 169 is different, e.g., narrower, than the width dimension of the second tab 165. The width dimensions are a second keying aspect, such that a ferrule holder 41, which does not possess two slots with the matching widths, will not be able to fully seat into the first port 250 of the adapter 201 and will therefore not be allowed to communicate with another connector seated in the second port 250A of the adapter 201.

As also seen in FIG. 15, the length dimension of the third tab 167 is different, e.g., longer, than the length dimension of the first tab 163, and the length dimension of the fourth tab 169 is different, e.g., longer, than the length dimension of the second tab 165. The length dimensions are a third keying aspect, such that a ferrule holder 41, which does not possess two slots with the correct depths, will not be able to fully seat into the first port 250 of the adapter 201 and will therefore not be allowed to communicate with another connector seated in the second port 250A of the adapter 201.

Such keying features may be used to enhance network security by preventing unauthorized network access to individuals not in possession of a fiber connector with a ferrule holder 41 having the proper keying features, e.g., slot arrangement.

Figure 16:
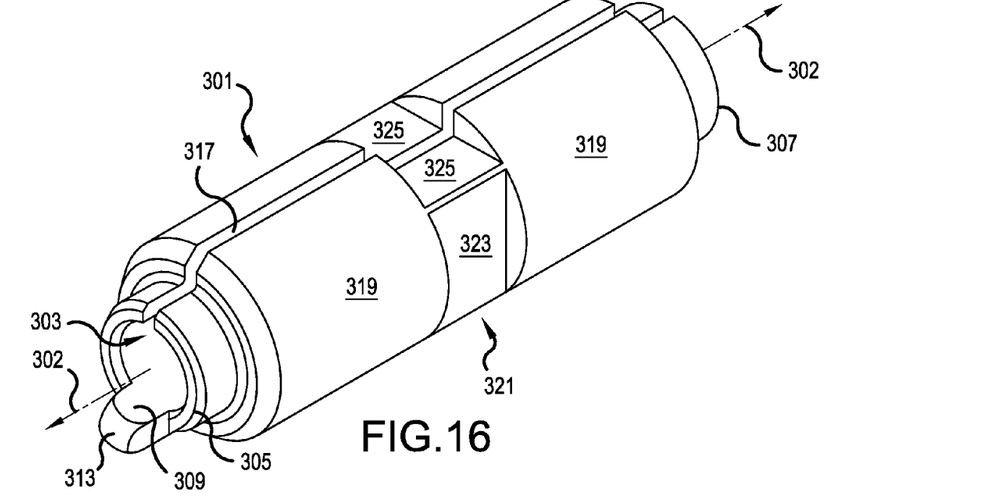
FIG. 16 is a perspective view of an alignment sleeve, in accordance with a second embodiment of the present invention.
Figure 17:
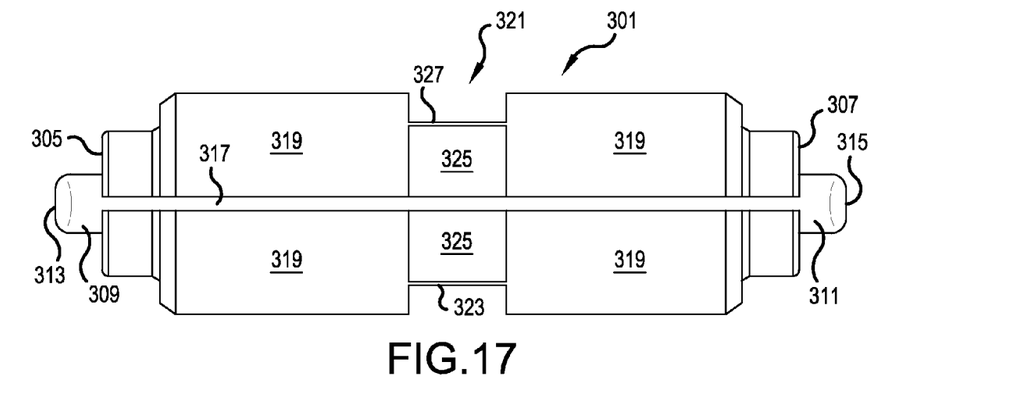
FIG. 17 is a top view of the alignment sleeve of FIG. 16.
Figure 18:
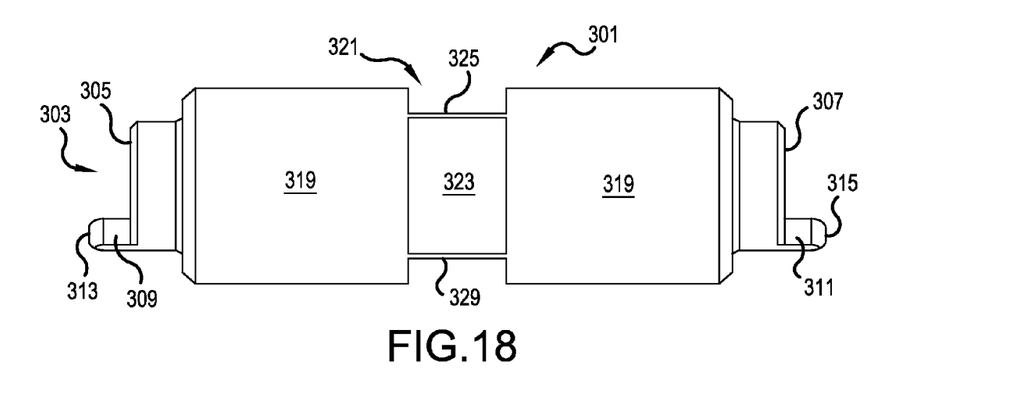
FIG. 18 is a side view of the alignment sleeve of FIG. 16.

FIGS. 16-18 show various views of a ferrule alignment sleeve 301, in accordance with a second embodiment of the present invention. The sleeve 301 extends in a longitudinal direction 302 and forms an inner, generally tubular area 303. A first rim 305 is formed around a first opening at one end of the tubular area 303 to receive an end of a first circular ferrule 40 (see FIG. 21). A second rim 307 is formed around a second opening at an opposite end of the tubular area 303 to receive an end of a second ferrule 40A.

A first tab 309 is located adjacent to the first rim 305 and projects away from the tubular area 303. A second tab 311 is located adjacent to the second rim 307 and projects away from the tubular area 303. In a preferred embodiment, the first tab 309 has a generally radiused or triangular tip at its distal end 313, and the second tab 311 also has a generally radiused or triangular tip at its distal end 315.

In one embodiment, the sleeve 301 is split in a direction parallel to its longitudinal line of extension 302 by an opening 317. Hence, the sleeve 301 presents a C-shaped appearance in a cross-sectional view, taken through some portions of the tubular area 303 in a direction perpendicular to its longitudinal line of extension 302. The sleeve 301 may be formed of zirconia, alumina, phosphor bronze, stainless steel, a filled polymer or unfilled polymer, a metal, an alloy, glass, ceramic, or similar material. Also, the sleeve 301 may be coated with a hard material, like diamond-grade materials or titanium nitride, to reduce wear due to abrasion.

In the embodiment depicted in FIGS. 16-18, the majority of the outer surface 319 of the sleeve 301 presents a generally smooth, cylindrical surface. However, the sleeve 301 of FIGS. 16-18 is thicker and much more robust that the sleeve 101 of FIGS. 7-9. A mid-section of the sleeve 301 includes a recessed area 321 extending into the outer surface 319 of the sleeve 301 toward the tubular inner area 303. In a preferred embodiment, the recessed area 321 includes a plurality of flat surfaces, such as first, second, third and fourth flat surfaces 323, 325, 327 and 329.

Figure 19:
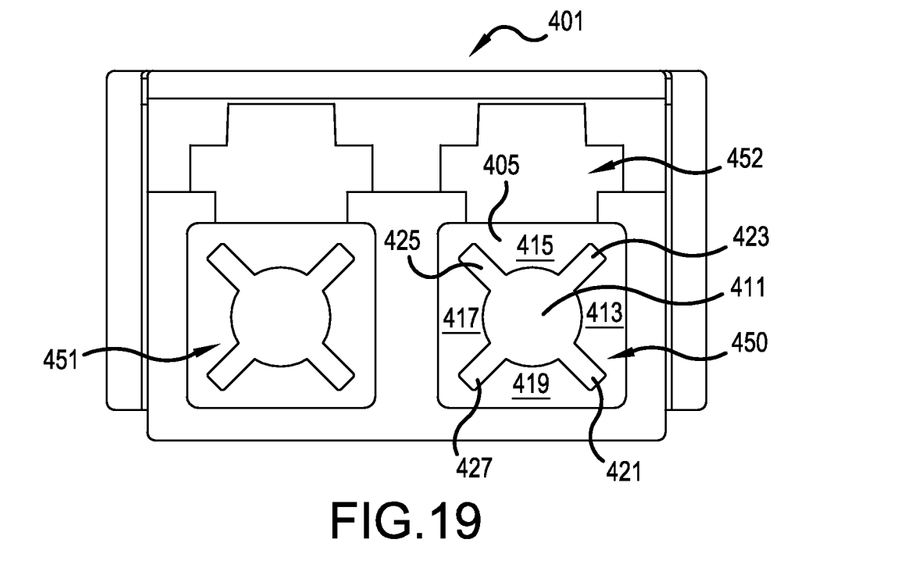
FIG. 19 is an end view looking into the ports of a fiber optic adapter, in accordance with a second embodiment of the present invention.
Figure 20:
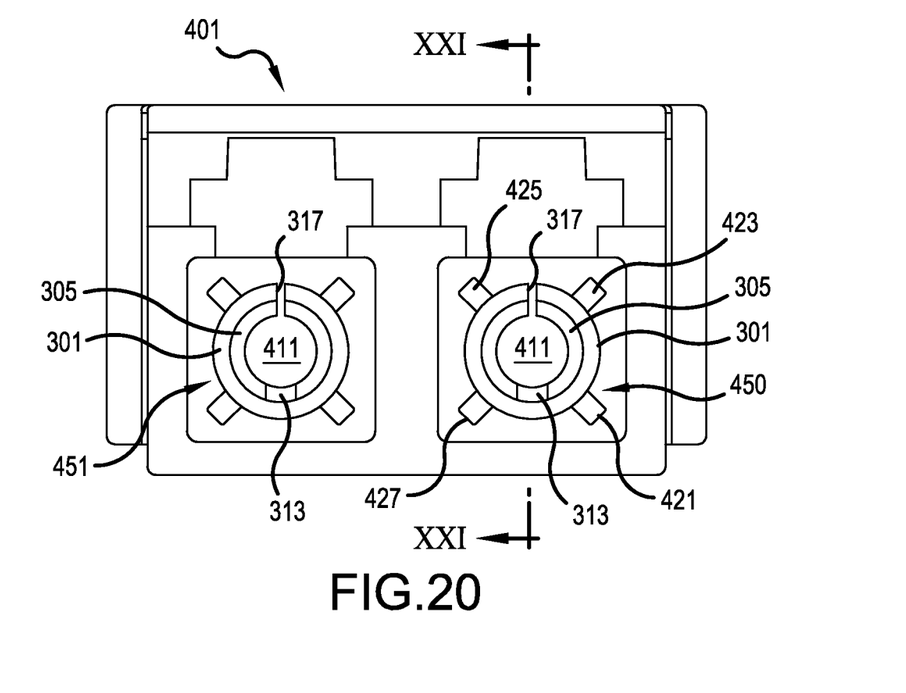
FIG. 20 is an end view similar to FIG. 19, but showing alignment sleeves of FIG. 16 being mounted within the ports.

FIGS. 19-20 are end views of a fiber optic adapter 401, in accordance with a second embodiment of the present invention. The exterior of the adapter 401, in perspective view, is the same as depicted in FIG. 10. Also, the adapter 401 would include four ports for making optical connections, as described in connection with FIG. 10.

In the end view of FIG. 19, the adapter 401 has a housing including a wall 405. A through hole 411 is formed in the wall 405. A first latch 413 projects from the wall 405 toward the through hole 411. Likewise, second, third and fourth latches 415, 417 and 419 project from the wall 405 toward different perimeter portions of the through hole 411.

In a preferred embodiment, the first resilient latch 413 is a portion of the wall 405 defined between a first void channel 421 and a second void channel 423. The second resilient latch 415 is a portion of the wall 405 defined between the second void channel 423 and a third void channel 425. The third resilient latch 417 is a portion of the wall 405 defined between the third void channel 425 and a fourth void channel 427. Finally, the fourth resilient latch 419 is a portion of the wall 405 defined between the fourth void channel 427 and the first void channel 421.

Also in the preferred embodiment, end edges of said latches 413, 415, 417 and 419 form an edge of the through hole 411. Each latch 413, 415, 417 and 419 is deflectable so as to deflect without breakage when engaged by an object slightly larger in size than the through hole 411 being pressed into the through hole 411. Also, each latch 413, 415, 417 and 419 is resilient so as to snap back to an original position after the oversized object disengages the end edges of the latches 413, 415, 417 and 419.

FIG. 20 depicts the insertion of the sleeve 301 of FIGS. 16-18 into the adapter 401. In FIG. 20, a sleeve 301 has been inserted into the through holes 411 of both ports 450 and 451 of the adapter 401. During insertion of the sleeve 301, the latches 413, 415, 417 and 419 deflect as the large cylindrical outer surface 319 enters the through hole 411. Once the leading edge of the recessed area 321 reaches the latches 413, 415, 417 and 419, the latches 413, 415, 417 and 419 snap into the recessed area 321 of said sleeve 301.

The latches 413, 415, 417 and 419 act to attach the sleeve 301 to the wall 405 within the housing of the adapter 401. In particular, the first, second, third and fourth flat surfaces 323, 325, 327 and 329 are engaged by the end edges of the first, second, third and fourth latches 413, 415, 417 and 419, respectively.

Figure 21:
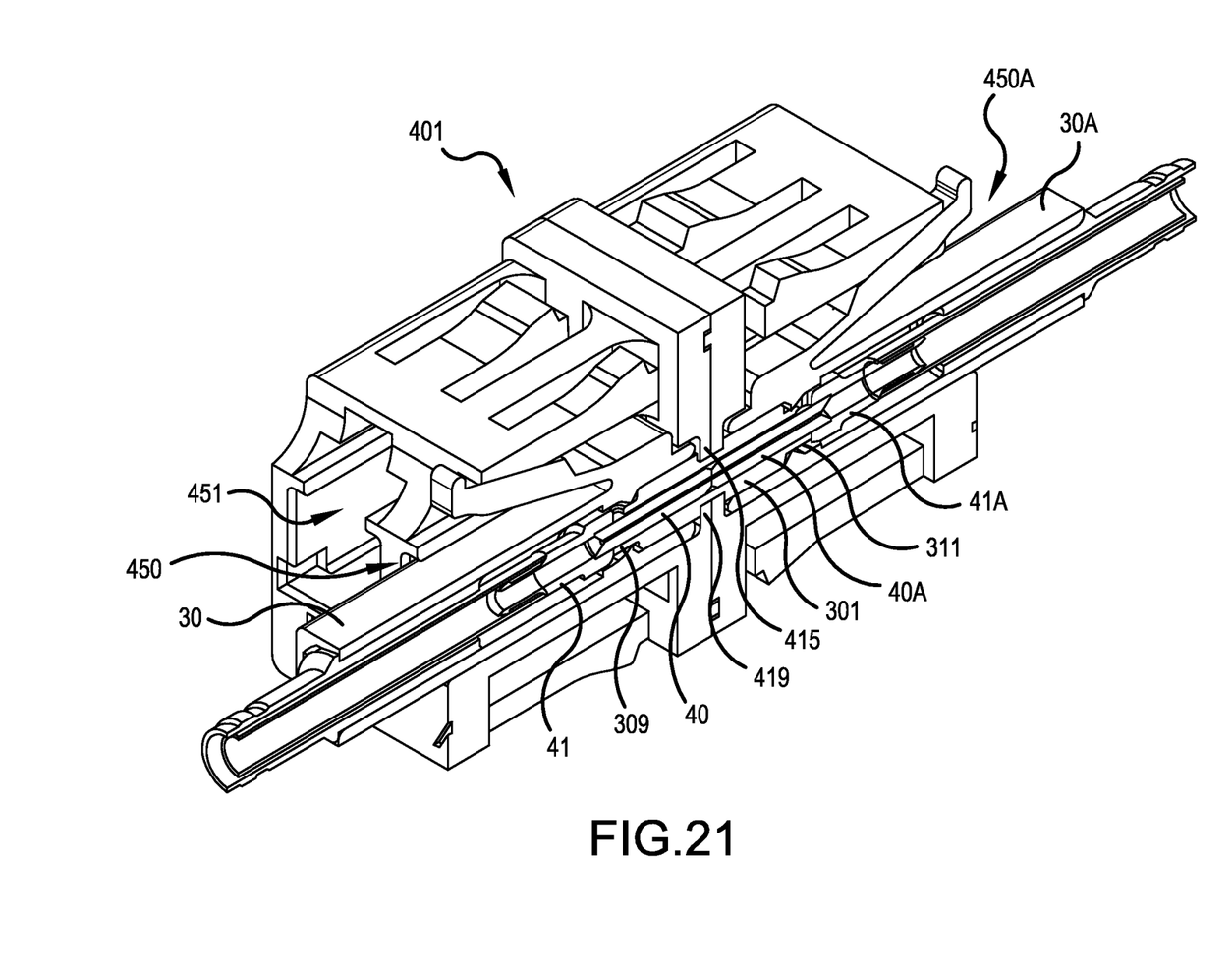
FIG. 21 is a perspective view of a cross-section taken along line XXI-XXI in FIG. 20, with first and second fiber connectors mated into the adapter.

FIG. 21 is a perspective view of a cross-section taken along line XXI-XXI in FIG. 20 with first and second fiber connectors 30 and 30A mated into the adapter 401.

The adapter 401 has a housing including a first port 450 on a first side of the wall 405 and a second port 450A on a second side of the wall 405. A first fiber optic connector 30 is seated into the first port 450. The first fiber optic connector 30 includes a first ferrule holder 41 holding a first ferrule 40 and a first optical fiber end 43 residing within a central bore of the first ferrule 40

A second fiber optic connector 30A is seated into the second port 450A. The second fiber optic connector 30A includes a second ferrule holder 41A holding a second ferrule 40A and a second optical fiber end 43A residing within a central bore of the second ferrule 40A.

The first tab 309 of the sleeve 301 extends into a first slot 47 formed in the first ferrule holder 41 when the first fiber optic connector 30 is seated into the first port 450. The said second tab 311 of the sleeve 301 extends into a second slot 47A formed in the second ferrule holder 41A when the second fiber optic connector 30A is seated into the second port 450A. The engagements made by the sleeve 301 align the first and second slots 47 and 47A of the first and second ferrule holders 41 and 41A, in a same or similar manner as described in conjunction with FIGS. 12-14. Again, the arrangement of FIG. 21 is particularly advantageous when the first optical fiber end 43 presents a first multi-core optical fiber, and the second optical fiber end 43A presents a second multi-core optical fiber, as the alignment of the said first and second slots 47 and 47A aligns the cores of the first and second multi-core optical fiber ends 43 and 43A during connector mating via the adapter 401.

The embodiment of FIGS. 16-21 has advantages over the embodiment of FIGS. 7-15. For example, the recessed area 321, e.g., squared section, prevents a twisting force from being transferred through the sleeve 301 to the ferrule holder 41 or 41A of the other connector 30 or 30A. Any twisting force applied by a ferrule holder 41 or 41A to the sleeve 301 will be absorbed by the latches 413, 415, 417 and 419, rather that transmitted through the adapter 310 to impart a twisting force on the other connector's ferrule holder.

Another advantage is that the adapter 401 need not be formed in two pieces as illustrated in FIG. 21. Rather, the wall 405 may be a shared wall between the first and second ports 450 and 450A. In the embodiment of FIGS. 7-15, it was convenient to separate the adapter 201 into halves 203 and 207, so as to insert the sleeve 101 into the bosses 215 and 221 for retention. In the embodiment of FIGS. 16-21, the sleeve 301 is combined with the function of the bosses, and snaps into place within the adapter 401, rendering the two piece construction unnecessary for retention of the sleeve 301.

Instead of sleeve 301 snapping into the wall 405 of the adapter 401, the sleeve 301 could also be adhered, e.g., by epoxy, or clipped or fastened into the adapter 401 by an attachment device, e.g., a clip, or molded directly into the wall 405 of the adapter 401.

The security keying features, as described in conjunction with the embodiment of FIG. 15, may also used in the embodiments of FIGS. 16-21 in a same or similar manner.

Although the figures have depicted LC type connectors with a hexagon flange 46 on the ferrule holder 41, it should be appreciated that the hexagonal shape of the flange 46 is not necessary in an LC connector 30, as the flange 46 could be square, conical, round with tabs or any combination of geometries known to one in the art. Also, the present invention is not limited to LC type connectors 30. For example, simplex and duplex connector schemes using other type connectors such as SC, FC, ST, MU or 38999/29504 connector types may be substituted into the teachings of the present invention. Also, the mating of bare ferrule barrel assemblies could be accomplished (as shown in FIGS. 13-14), whereby no connector envelope is employed.

Although the figures have depicted a split sleeve 101, 161 or 301, it should be apparent that a solid sleeve may be used in the embodiments of the invention.

Although the specification has described, and FIG. 6 has illustrated, a multi-core optical fiber end 43' with a central core 12a and six, equally-spaced, satellite cores 12b-12g, more or fewer satellites cores could be used. Further, the spacing between cores need not be equal or even symmetrical. Further, a central core 12a is not required. The benefits of the present invention in aligning a first layout pattern of cores in a multi-core optical fiber end 43' to a same layout pattern of cores in another multi-core optical fiber end 43A' will exist regardless of any specific core pattern, so long as the pattern at the first optical fiber end 43' is the same as the pattern at the second optical fiber end 43A'.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A device comprising:
   a ferrule alignment sleeve, wherein said sleeve extends in a longitudinal direction and forms an inner, generally tubular area;
   a first rim formed around a first opening at one end of said tubular area to receive an end of a first ferrule;
   a second rim formed around a second opening at an opposite end of said tubular area to receive an end of a second ferrule; and
   a first tab adjacent said first rim and projecting away from said first rim and said tubular area to interact with a feature associated with the first ferrule to angularly align the first ferrule within said generally tubular area.

2. The device of claim 1, wherein said sleeve is split along its longitudinal line of extension, presenting a C-shaped appearance in a cross-sectional view, taken through said tubular area in a direction perpendicular to its longitudinal line of extension.

3. The device of claim 1, wherein an outer surface of said sleeve presents a generally cylindrical surface.

4. The device of claim 1, further comprising:
   a second tab adjacent said second rim and projecting away from said second rim and said tubular area to interact with a feature associated with the second ferrule to align the second ferrule within said generally tubular area.

5. The device of claim 4, wherein said first tab has a generally radiused or triangular tip at its distal end; and wherein said second tab has a generally radiused or triangular tip at its distal end.

6. The device of claim 4, wherein a mid-section of said sleeve includes a recessed area extending into an outer surface of said sleeve toward said tubular inner area.

7. The device of claim 6, further comprising:
   an adapter housing having a wall;
   a through hole formed in said wall of said adapter housing; and
   at least one resilient latch projecting from said wall toward said through hole, wherein said at least one resilient latch snaps into said recessed area of said sleeve as said sleeve passes through said through hole and acts to attach said sleeve within said adapter housing.

8. The device of claim 7, wherein said at least one resilient latch includes first and second resilient latches projecting toward different perimeter portions of said through hole, and wherein said recessed area includes first and second flat surfaces, which are engaged by said first and second resilient latches, respectively, when said sleeve is attached within said adapter housing.

9. The device of claim 8, wherein said first and second resilient latches are first and second portions of said wall defined between void channels formed in said wall.

10. The device of claim 7, wherein said adapter housing includes a first port on a first side of said wall and a second port on a second side of said wall, and further comprising:
   a first fiber optic connector seated into said first port, said first fiber optic connector including a first ferrule holder holding said first ferrule and a first optical fiber residing within a central bore of said first ferrule; and
   a second fiber optic connector seated into said second port, said second fiber optic connector including a second ferrule holder holding said second ferrule and a second optical fiber residing within a central bore of said second ferrule;
   wherein said first tab of said sleeve extends into a first slot formed in said first ferrule holder when said first fiber optic connector is seated into said first port, and said second tab of said sleeve extends into a second slot formed in said second ferrule holder when said second fiber optic connector is seated into said second port, so as to align said first and second slots of said first and second ferrule holders.

11. The device of claim 10, wherein said first optical fiber is a first multi-core optical fiber, and said second optical fiber is a second multi-core optical fiber, and wherein when said first and second slots of said first and second ferrule holders are aligned, cores of said first and second multi-core optical fibers are aligned.

12. A device comprising:
   a ferrule alignment sleeve, wherein said sleeve extends in a longitudinal direction and forms an inner, generally tubular area;
   a first rim formed around a first opening at one end of said tubular area to receive an end of a first circular ferrule;
   a second rim formed around a second opening at an opposite end of said tubular area to receive an end of a second ferrule;
   a first tab adjacent said first rim and projecting away from said tubular area;
   a second tab adjacent said second rim and projecting away from said tubular area;
   an adapter housing having a first part with a first wall and a second part with a second wall;
   a first through hole formed in said first wall of said first part;
   a second through hole formed in said second wall of said second part;
   a first cylindrical boss having a proximate end attached to said first wall and encircling said first hole, said first cylindrical boss extending away from said first wall and terminating at a distal end with a first turned edge protruding toward a center of said first cylindrical boss, with a first gap formed in said first turned edge; and
   a second cylindrical boss having a proximate end attached to said second wall and encircling said second hole, said second cylindrical boss extending away from said second wall and terminating at a distal end with a second turned edge protruding toward a center of said second cylindrical boss, with a second gap formed in said second turned edge;
   wherein said first wall abuts and is retained in abutment with said second wall with said first and second holes aligned, wherein said sleeve resides inside said first boss and said second boss, wherein said first rim of said sleeve cannot pass by said first turned edge of said first boss and said second rim of said sleeve cannot pass by said second turned edge of said second boss, so as to attach said sleeve within said adapter housing, and wherein said first tab of said sleeve passes through said first gap in said first turned edge and said second tab of said sleeve passes through said second gap in said second turned edge.

13. The device of claim 12, wherein said adapter housing includes a first port on a side of said first wall possessing said first boss and a second port on a side of said second wall possessing said second boss, and further comprising:
   a first fiber optic connector seated into said first port, said first fiber optic connector including a first ferrule holder holding said first ferrule and a first optical fiber residing within a central bore of said first ferrule; and
   a second fiber optic connector seated into said second port, said second fiber optic connector including a second ferrule holder holding said second ferrule and a second optical fiber residing within a central bore of said second ferrule;
   wherein said first tab of said sleeve extends into a first slot formed in said first ferrule holder when said first fiber optic connector is seated into said first port, and said second tab of said sleeve extends into a second slot formed in said second ferrule holder when said second fiber optic connector is seated into said second port, so as to align said first and second slots of said first and second ferrule holders.

14. The device of claim 13, wherein said first optical fiber is a first multi-core optical fiber, and said second optical fiber is a second multi-core optical fiber, and when said first and second slots of said first and second ferrule holders are aligned, cores of said first and second multi-core optical fibers are aligned.

15. The device of claim 4, further comprising:
   a third tab adjacent said first rim and projecting away from said first rim and said tubular area, wherein said third tab is spaced a predetermined distance away from said first tab; and
   a fourth tab adjacent said second rim and projecting away from said second rim and said tubular area, wherein said fourth tab is spaced a predetermined distance away from said second tab.

16. The device of claim 15, wherein said third tab has a width dimension which is different than a width dimension of said first tab, and the same as a width dimension of said fourth tab.

17. A device comprising:
   a ferrule alignment sleeve, wherein said sleeve extends in a longitudinal direction and forms a generally tubular inner area, and wherein a mid-section of said sleeve includes a recessed area extending into an outer surface of said sleeve toward said tubular inner area;
   a first rim formed around a first opening at one end of said tubular area to receive an end of a first ferrule;
   a second rim formed around a second opening at an opposite end of said tubular area to receive an end of a second ferrule;
   a first tab adjacent said first rim and projecting away from said first rim and said tubular area;
   a second tab adjacent said second rim and projecting away from said second rim and said tubular area;
   an adapter housing having a wall;
   a through hole formed in said wall of said adapter housing; and a latch projecting from said wall toward said through hole, wherein an end edge of said latch forms an edge of said through hole, and wherein said latch is deflectable so as to deflect without breakage when engaged by an object larger in size than said through hole being pressed into said through hole, wherein said latch is resilient so as to snap back to an original position after the oversized object disengages said end edge of said latch, and wherein said at least one resilient latch snaps into said recessed area of said sleeve as said sleeve passes through said through hole and acts to attach said sleeve within said adapter housing.

18. The device of claim 17, wherein said latch is a first latch, and further comprising:
a second latch projecting from said wall toward said through hole, wherein an end edge of said second latch forms an edge of said through hole along a different perimeter portion of said through hole, and wherein said second latch is deflectable so as to deflect without breakage when engaged by an object larger in size than said through hole being pressed into said through hole, and wherein said second latch is resilient so as to snap back to an original position after the oversized object disengages said end edge of said second latch.

19. The device of claim 18, wherein said first and second latches are first and second portions of said wall defined between void channels formed in said wall.

* * * * *